(No Model.)

S. E. HARSH.
CHECK HOLDER AND CHECK SPREADER.

No. 415,038. Patented Nov. 12, 1889.

Witnesses:
E. C. Duffy
H. E. Peck

Inventor:
Samuel E. Harsh
per O. E. Duffy
Attorney

UNITED STATES PATENT OFFICE.

SAMUEL E. HARSH, OF WABASH, INDIANA, ASSIGNOR OF ONE-HALF TO JOHN M. HARTER, OF SAME PLACE.

CHECK-HOLDER AND CHECK-SPREADER.

SPECIFICATION forming part of Letters Patent No. 415,038, dated November 12, 1889.

Application filed May 11, 1889. Serial No. 310,385. (No model.)

*To all whom it may concern:*

Be it known that I, SAMUEL E. HARSH, of the city of Wabash, in the county of Wabash and State of Indiana, have invented certain new and useful Improvements in Check-Holders and Check-Spreaders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in checkrein-holders.

The object of the invention is to provide an improved checkrein-holder, either a single overdraw holder or a double spreader and holder, exceedingly cheap, simple and durable in construction, easily and readily manufactured at a minimum cost, and provided with an improved means or manner of attaching the flexible loop to the body of the holder, so that there will be no independent movement of the parts at the joint.

These ends are accomplished by and my invention consists in certain novel features of construction and combinations of parts more fully described hereinafter, and particularly pointed out in the claims.

Figure 1:
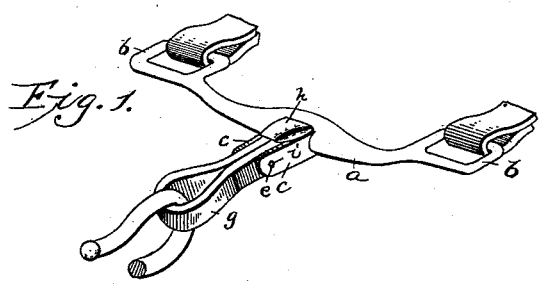
Figure 2:
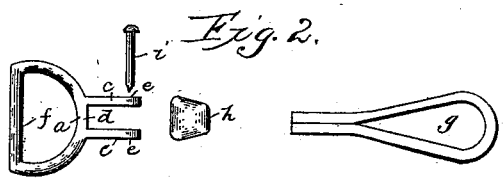
Figure 3:
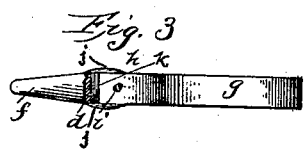
Figure 4:
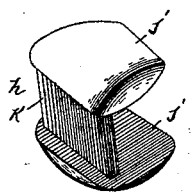

Referring to the accompanying drawings, Figure 1 is a perspective view of a portion of a harness-hook and the checkreins, showing the present improvement in the form of a double spreader and holder. Fig. 2 is a plan of the various parts of the improved holder separated. Fig. 3 is an elevation showing the parts shown in Fig. 2 assembled, a portion of the holder being broken away. Fig. 4 is an enlarged detail view of the socket receiving the ends of the leather forming the flexible loop.

In the drawings, the reference-letter $a$ indicates the bar of the spreader and holder of Fig. 1, provided at its opposite ends with the loops $b\ b$, to which the checkrein is secured, and by which the two straps of the same are held in position and a suitable distance apart. A pair of parallel ears $c\ c$, with their inner faces a distance apart, extend rearwardly from the central portion of the rear edge of the bar $a$ and are cast or otherwise formed integral with the same. The rear edge of the bar between these ears is preferably squared to form a shoulder $d$, as shown, and the ears are provided with registering apertures $e\ e$.

The single overdraw loop of Fig. 2 has but the single loop $f$, through which the check-rein passes and around the front bar of which it is secured, and the rear bar $a$ of this single loop is centrally provided with the ears $c\ c$, having apertures $e\ e$, and the shoulder $d$, as just described in connection with the double holder and spreader.

The flexible loop $g$, adapted to slip upon the harness-hook, consists of a single length of leather, (or other flexible material,) which is doubled and its ends brought together and inserted within a supplemental socket $h$, which fits between the ears of the body of the holder and bears against the square shoulder between the ears. A pin, screw, or rivet $i$ is then passed through the apertures $e$ and ends of the leather, thereby securing the flexible loop and body of the holder together. The cushion or supplemental socket $h$ is cast or formed in one piece, and consists of two wings $j\ j$, which bear upon the opposite edges of the ends of the leather, and, when in position, upon the upper and lower edges of the ears $c\ c$ and also upon the edges of the bar $a$ of the body of the holder, and these two wings or ears $j\ j$ are connected by a neck or strip $k$, formed integral with the same, and against which the ends of the leather bear, and which fits between the ears $c\ c$ and bears against the shoulder $d$. It will thus be seen that a rectangular socket is formed, two sides of which are formed by the ears $c\ c$, and the top and bottom sides of which are formed by the wings $j\ j$ of the supplemental socket. The ends of the leather fit in the socket thus formed, thereby holding the same rigid and preventing any movement or turning on the rivet. The wings of the supplemental socket flare outwardly to admit the ends of the leather, and when inserted between the ears $c\ c$ the wings are hammered down to securely hold the leather and prevent movement of the supplemental socket.

What I claim is—

1. A checkrein-holder consisting of a loop or loops to which the checkrein is secured, provided with a rearwardly-extending rectangular socket the sides of which are formed of a pair of rearwardly-extending ears and the top and bottom sides of which are provided with a pair of rearwardly-extending wings on the edges of said ears, and the flexible loop consisting of a strip of leather having its ends inserted in said socket and secured therein by a rivet passed through the ears, substantially as described.

2. In a checkrein holder or spreader, the combination, with a pair of ears extending rearwardly from the body, of the loop secured between said ears, and a socket on the ends of the flexible loop consisting of a pair of wings bearing on the opposite edges of said ends and the ears and connected by a neck against which the end edges of the loop ends bear, for the purpose set forth.

In testimony that I claim the foregoing as my own invention I affix my signature in presence of two witnesses.

SAMUEL E. HARSH.

Witnesses:
  JOHN H. DICKEN,
  WARREN BIGLER.